US006799373B2

(12) United States Patent
Menzel et al.

(10) Patent No.: US 6,799,373 B2
(45) Date of Patent: Oct. 5, 2004

(54) PORTABLE WORK APPARATUS

(75) Inventors: Johannes Menzel, Stuttgart (DE); Markus Keller, Leutenbach (DE); Helmut Lux, Waiblingen (DE); Jürgen Steinmaier, Notzingen (DE); Ralf-Rainer Kemmler, Schwaikheim (DE)

(73) Assignee: Andreas Stihl AG & Co., Waiblingen (DE)

( * ) Notice: Subject to any disclaimer, the term of this patent is extended or adjusted under 35 U.S.C. 154(b) by 0 days.

(21) Appl. No.: 10/162,904

(22) Filed: Jun. 6, 2002

(65) Prior Publication Data

US 2002/0184987 A1 Dec. 12, 2002

(30) Foreign Application Priority Data

Jun. 11, 2001 (DE) ........................................ 101 28 188

(51) Int. Cl.[7] .......................... B27B 17/02; B23D 57/02

(52) U.S. Cl. .............................. 30/381; 30/383; 30/520

(58) Field of Search .............................. 83/788; 30/381, 30/382, 383, 517, 340, 520, 384, 385, 386

(56) References Cited

U.S. PATENT DOCUMENTS

| | | | | | |
|---|---|---|---|---|---|
| 3,637,029 | A | * | 1/1972 | Sherwood et al. | 173/162.2 |
| 3,651,839 | A | * | 3/1972 | Stihl et al. | 30/381 |
| 3,698,455 | A | * | 10/1972 | Frederickson et al. | 30/381 |
| 3,813,776 | A | * | 6/1974 | Frederickson et al. | 30/381 |
| 4,041,606 | A | * | 8/1977 | Thompson | 30/381 |
| 4,141,143 | A | * | 2/1979 | Hirschkoff et al. | 30/381 |
| 4,178,685 | A | * | 12/1979 | Inaga | 30/381 |
| 4,219,932 | A | * | 9/1980 | Nagashima et al. | 30/381 |
| 4,296,553 | A | * | 10/1981 | Dirks et al. | 30/381 |
| 4,411,071 | A | * | 10/1983 | Takahashi et al. | 30/381 |
| 4,964,217 | A | * | 10/1990 | Siede et al. | 30/383 |
| 5,046,566 | A | * | 9/1991 | Dorner et al. | 173/162.2 |
| 5,699,865 | A | * | 12/1997 | Forderer et al. | 173/162.2 |
| 5,960,549 | A | * | 10/1999 | Hoppner | 30/381 |
| 6,016,604 | A | * | 1/2000 | Wolf et al. | 30/383 |
| 6,427,641 | B1 | * | 8/2002 | Ziegs | 123/41.56 |
| 2001/0010122 | A1 | * | 8/2001 | Taomo et al. | 30/383 |

* cited by examiner

*Primary Examiner*—Boyer D. Ashley
(74) *Attorney, Agent, or Firm*—Walter Ottesen

(57) ABSTRACT

A portable work apparatus, especially a motor-driven chain saw (1), has a drive unit which is provided with a handle housing (3). The handle housing (3) includes an extension (9) which extends in the longitudinal direction of the work apparatus from a rearward handle (8) on the side facing away in the longitudinal direction from a guide bar (6) forward to the side facing toward the guide bar (6). The handle housing (3) is connected via antivibration elements to the drive unit. The work apparatus has a forward handle tube (4), which extends over the work apparatus transversely to the longitudinal direction and is attached with an end (10) to the free end of the extension (9) and with the other end (27) in the area of the rearward handle (8). At least one of the ends (10, 27) of the handle tube (4) is fixed via an antivibration element (11, 25, 26, 28, 34).

16 Claims, 4 Drawing Sheets

PORTABLE WORK APPARATUS

BACKGROUND OF THE INVENTION

In a known motor-driven chain saw, forward and rearward handles are provided, which are connected by respective antivibration elements to the drive unit. The rearward handle comprises a handle which has an extension extending in the longitudinal direction of the chain saw. The extension has a forward end which is attached to a handle tube. The handle tube extends over the drive unit and is fixed with its other end to the handle housing. In practice, it has been determined that resonance frequencies occur under specific operating conditions and these resonance frequencies are a burden to the operator and contribute to making work with the apparatus tiring.

SUMMARY OF THE INVENTION

It is an object of the invention to provide a work apparatus wherein the damping of vibrations is improved.

The portable handheld work apparatus of the invention includes a motor-driven chain saw and defines a longitudinal axis. The portable handheld work apparatus includes: a drive unit; a handle housing defining a rearward handle; antivibration means for connecting the handle housing to the drive unit; a guide bar connected to the drive unit; the handle housing having a first end facing away from the guide bar with the first end being in the longitudinal direction of the guide bar and the handle housing having a second end facing toward the guide bar; the handle housing having an extension member extending forwardly from the rearward handle at the first end to the second end; the extension member having a free end portion; a forward handle tube passing over the drive unit transversely to the longitudinal axis; the forward handle tube having a first end attached to the free end portion and a second end attached in the region of the rearward handle; and, one of the first and second ends of the forward handle tube being fixed via an antivibration element.

The transmission of vibrations to the handle tube (the vibrations occur in the handle housing or are transmitted thereby) are reduced by decoupling the handle tube from the handle housing by a vibration element at least at one end of the handle tube. The entire system is modified with respect to vibrations so that burdensome resonances are shifted out of the normal operating range and can no longer affect the operator. In an embodiment of the invention, both ends of the handle tube are attached to the handle housing via respective antivibration elements.

Advantageously, one of the ends of the handle tube is fixed via an antivibration element to the handle housing as well as to a housing part connected to the drive unit. In this way, the transmission of vibration is reduced especially effectively. The outer boundary line of a cross section of the handle tube advantageously encloses a smaller area at an end of the handle tube facing toward the antivibration element than in a center region of the handle tube. In this way, the space, which is available for accommodating the vibration-damping element and the attachment means, is increased. The end of the handle tube can have a flat shape or can have a smaller outer diameter than a center region of the handle tube.

The antivibration element advantageously has an approximately cylindrical form and is mounted in the longitudinal direction of the handle tube. A holder, which is provided on the handle housing, encloses the antivibration element at least partially. It is especially practical to mount the rearward end of the handle tube, which is attached directly to the handle housing, within the vibration-damping element.

According to another embodiment of the invention, the antivibration element is configured as a bushing having a collar and the bushing is mounted in a cutout approximately perpendicular to the longitudinal axis of the handle tube.

The antivibration element is advantageously configured to be an approximately flat component. The antivibration element is configured in two parts for the embodiment of the vibration-damping element in the form of a bushing as well as for the flat configuration. The vibration-damping element partially covers the facing sides of the handle housing and/or of the handle tube. This embodiment makes possible an advantageous constructive configuration especially for the attachment of the forward end of the handle tube attached to the extension of the handle housing. With an approximately flat configuration of the vibration-damping element, the handle tube and the handle housing can be attached separately from each other to the antivibration element. This is especially so for the attachment of the rearward end of the handle tube.

The handle housing (especially the extension of the handle housing) is attached to a first region of the antivibration element and, at a second region of the antivibration element, a housing part, which is connected to the drive unit (especially the motor housing), is attached. The first and second regions are spaced from each other in the longitudinal direction of the handle tube.

The antivibration element advantageously is made of microcellular polyurethane. The material ensures an excellent damping without affecting the ability of the operator to manipulate the work apparatus.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
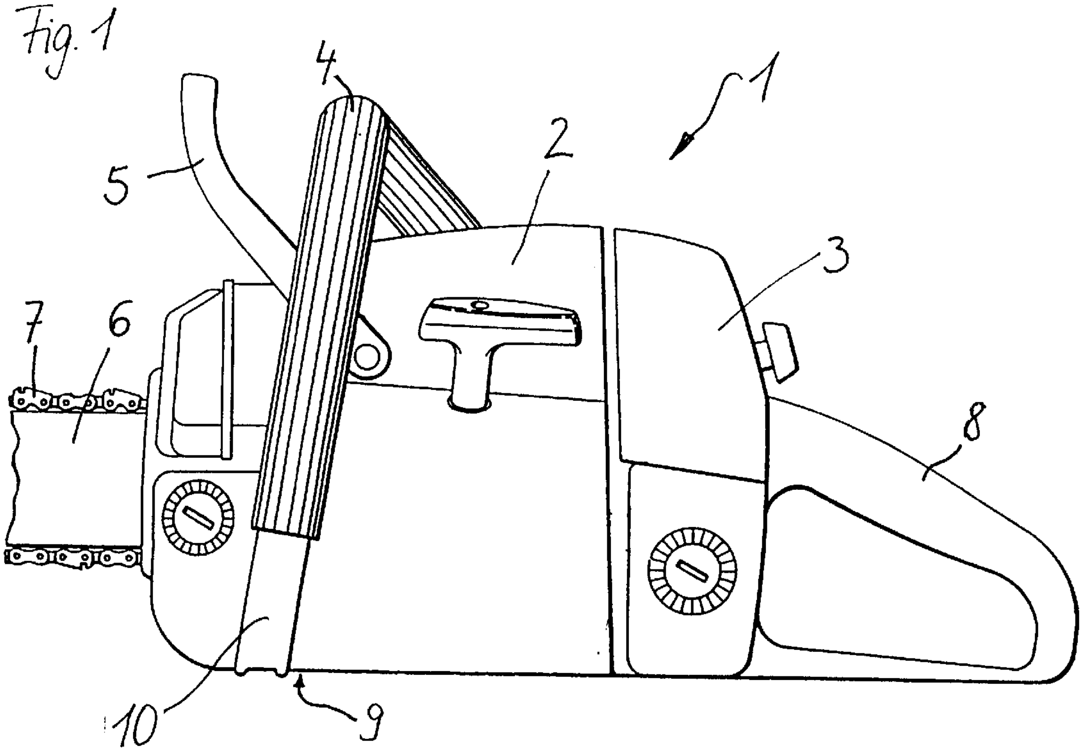
FIG. 1 is a side elevation view of a motor-driven chain saw.

FIG. 1 shows a motor-driven chain saw 1 having a motor housing 2, a handle housing 3, a handle tube 4, a protective device 5 for the hand and a guide bar 6 having a saw chain 7 arranged thereon. The motor housing 2 with the motor mounted therein defines the drive unit which is held on the handle housing 3 via antivibration elements.

Figure 2:
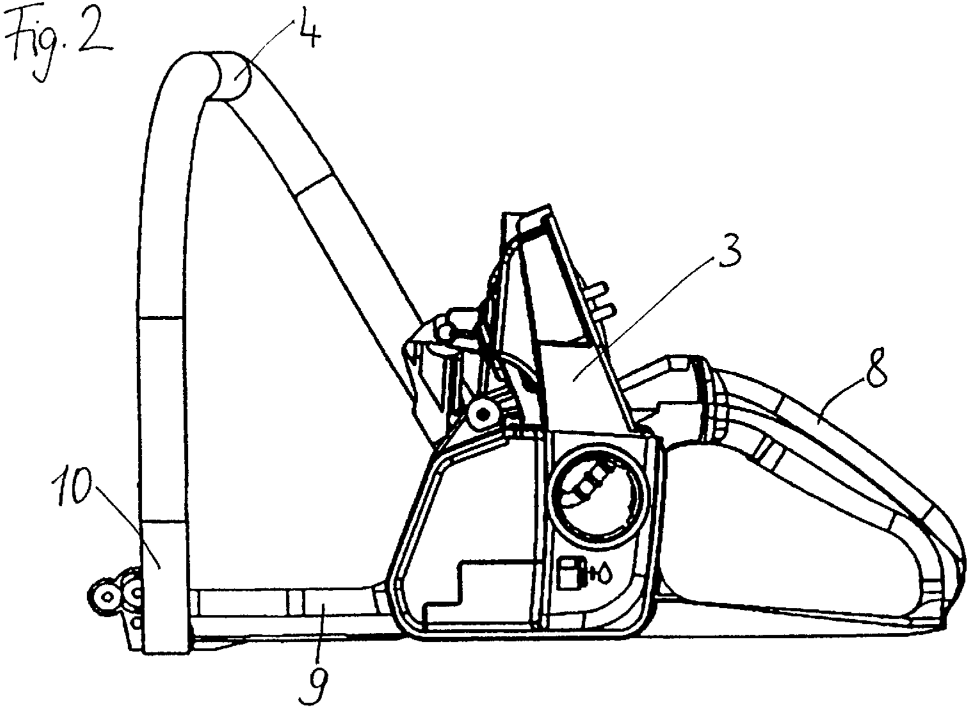
FIG. 2 is a side elevation view of the handle housing of a motor-driven chain saw having a handle tube.

As shown in FIG. 2, the handle housing 3 includes a rearward handle 8 which is mounted on the end lying opposite the guide bar 6. The handle housing 3 further includes an extension 9 projecting outwardly and forwardly in the longitudinal direction of the chain saw 1. The handle tube 4 has a forward end 10 which is attached to the free end of the extension 9 of the handle housing 3.

Figure 3:
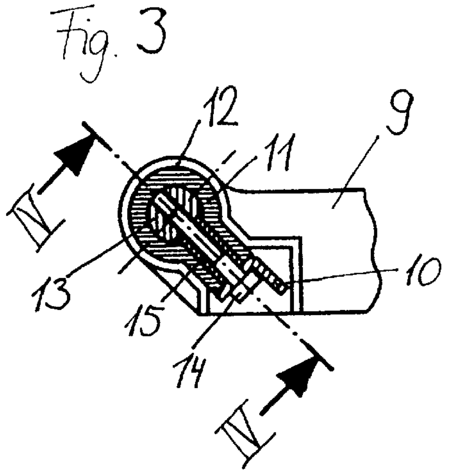
FIG. 3 is a section view of a connection of the forward handle tube end to an extension of the handle housing.
Figure 4:
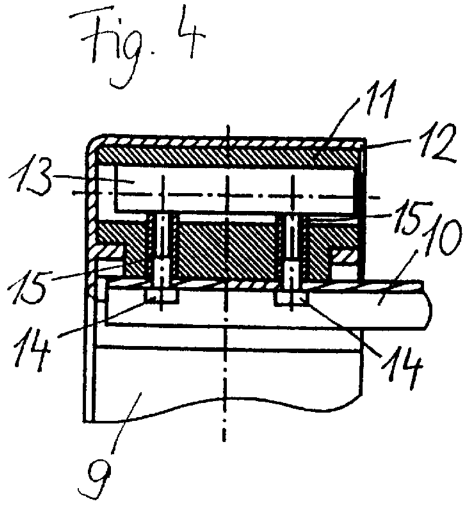
FIG. 4 is a section view taken along line IV—IV of FIG. 3.

FIGS. 3 and 4 show the attachment of the handle tube 4 to the extension 9. The extension 9 includes a cylindrical holder 12 in the longitudinal direction of the handle tube 4. The holder 12 has a slot extending in the longitudinal direction thereof and directed at an angle downwardly. The antivibration element 11 is mounted in the holder 12 and is likewise approximately cylindrical and has an outer diameter corresponding to the inner diameter of the holder 12. The antivibration element 11 has an approximately parallelepiped-shaped portion extending outwardly and this portion projects through the slot in the holder 12. A cylindrical component 13 is mounted within the antivibration element 11. The component 13 is flat in its longitudinal direction and is provided with two bores and the outer diameter of the component 13 corresponds approximately to the inner diameter of the antivibration element 11. The forward end 10 of the handle tube 4 is flattened to have an L-shape and is attached to the cylindrical component 13 with two screws 14 so that the handle tube 4 is in contact only with the parallelepiped-shaped portion of the antivibration element 11 and is not in contact with the extension 9 of the handle housing 3. The screws 14 extend through spacer sleeves 15. The spacer sleeves 15 prevent that the antivibration elements 11 become too greatly pressed together when tightening the screws 14.

Figure 5:
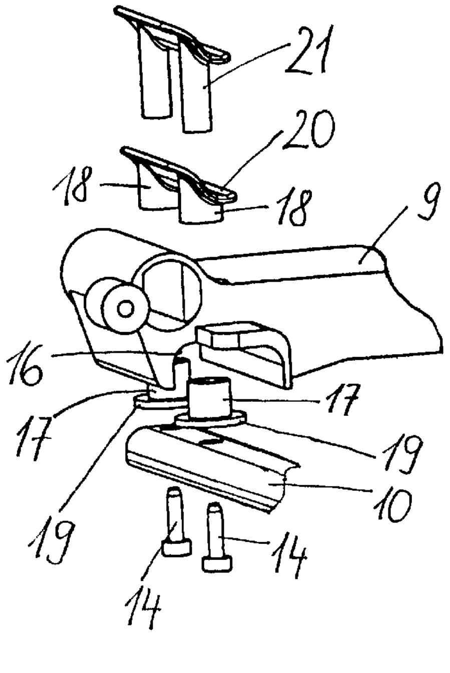
FIG. 5 is an exploded view of another connection of the forward handle tube end to the handle housing.

FIG. 5 shows another embodiment for the attachment of the forward end 10 of the handle tube 4 to the extension 9 of the handle housing 3 wherein the extension 9 has a cutout 16 which functions as a holder. The cutout 16 is formed on the lower side of the extension 9 and is in the longitudinal direction of the handle tube 4. The contour on the lower end of the cutout 16 corresponds to the contour of the upper side of the U-shaped flattened end 10 of the handle tube 4. The antivibration element is configured as a two-part bushing (17, 18). The lower element 17 of the bushing has a lateral collar 19 at its lower end and the upper element 18 of the bushing has a collar 20 at its upper end. The collar 19 of the lower element 17 of the bushing defines a support surface between the forward end 10 of the handle tube 4 and the handle housing 3; whereas, the collar 20 of the upper element 18 of the bushing lies between the extension 9 and a sleeve 21 which likewise has a collar. A screw 14 and a sleeve 21 project through both elements 17 and 18 of the bushing. The sleeve 21 has an internal thread and defines the counterpiece to the screw thread. The screw 14 and the sleeve 21 connect the forward end 10 of the handle tube 4 to the two elements 17 and 18 of the bushing and to the handle housing 3. The sleeve 21 functions simultaneously as a spacer element in order to avoid the bushing from becoming pressed excessively when tightening the screw 14. Two two-part bushings 17 and 18, two screws 14 and two sleeves 21 are all provided to achieve good damping and to fix the handle tube 4 adequately to the extension 9. The two upper elements of the bushings 17, the two lower elements of the bushings 18 and the two sleeves 21 can each be configured as one part in order to facilitate assembly.

Figure 6:
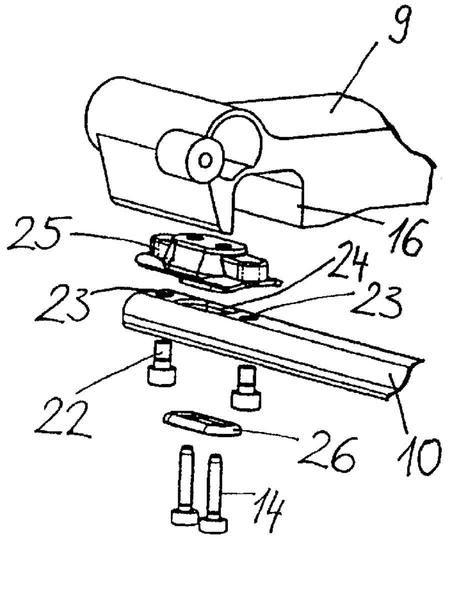
FIG. 6 is an exploded view of another connection of the forward handle tube end to the handle housing.

In a further embodiment shown in FIG. 6, the forward end 10 of the grip tube 4 is likewise configured to have a U-shape and the extension 9 has a cutout 16 on its lower side. The cutout 16 corresponds to the contour of the handle tube.

The antivibration element (25, 26) is flat and configured as two parts and is approximately as wide as the handle tube 4. The upper part 25 of the antivibration element is fixed with two screws 22 to the handle tube 4. The two screws 22 project from the lower side through two bores 23 into the forward end 10 of the handle tube 4. The forward end 10 of the handle tube 4 has a cutout 24 between the two bores 23. The lower part 26 of the antivibration element is mounted below the cutout 24 and is somewhat greater than this cutout. The antivibration element (25, 26) is fixed with two screws 14 between the forward end 10 of the handle tube 4 and the extension 9 of the handle housing 3. The screws 14 project through the following: the lower part 26 of the element, the cutout 24 and the upper part 25 of the element. The screws 14 can be threadably fastened directly in the extension 9 or the screws can be threadably fastened with nuts or with sleeves provided with internal threads through openings in the extension 9 at the upper end thereof.

Figure 7:
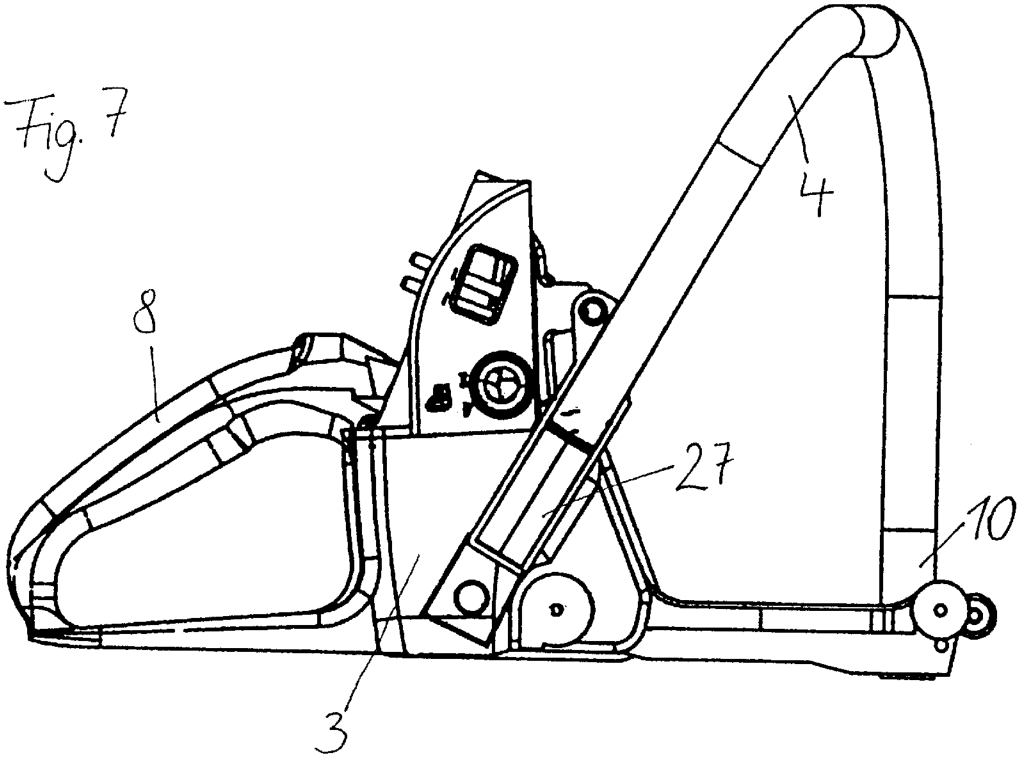
FIG. 7 is a further side elevation view of the handle housing of FIG. 2.

FIG. 7 shows a side elevation view of the handle housing 3 of FIG. 2 wherein the rearward end 27 of the handle tube 4 is attached to the handle housing 3. The rearward end 27 can likewise be connected to the handle housing 3 via antivibration elements.

Figure 8:
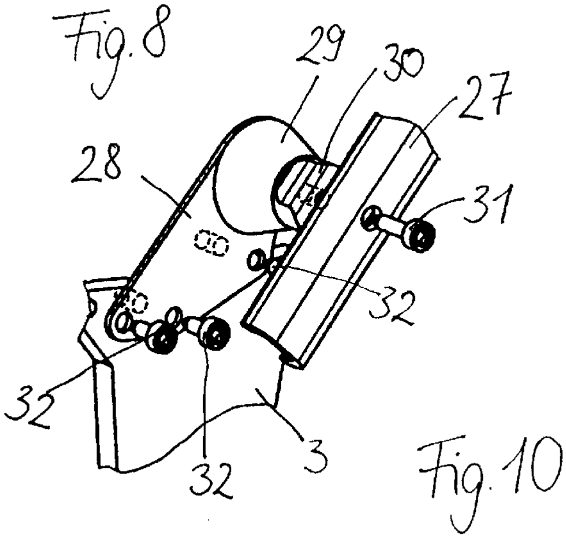
FIG. 8 is an exploded view of a connection of the rearward handle tube end to the handle housing.

FIG. 8 shows an antivibration element 28 which is configured to be flat and a cone 29 is formed on the end thereof and a cylinder 30 is formed on the outer side thereof. The cone 29 projects laterally and is tapered. The cylinder 30 is laterally so flattened that it fits into the end 27 of the handle tube 4. The end 27 is configured to have a U-shape. The antivibration element 28 is fixed with a screw 31 on the rearward end 27 of the handle tube 4. The screw 31 projects through the rearward end 27 of the handle tube 4 and is threadably engaged in the cylindrical part 30 or in the cone 29 of the antivibration element 28. The flat end of the antivibration element 28 is fixed with three screws 32 on the handle housing 3.

Figure 9:
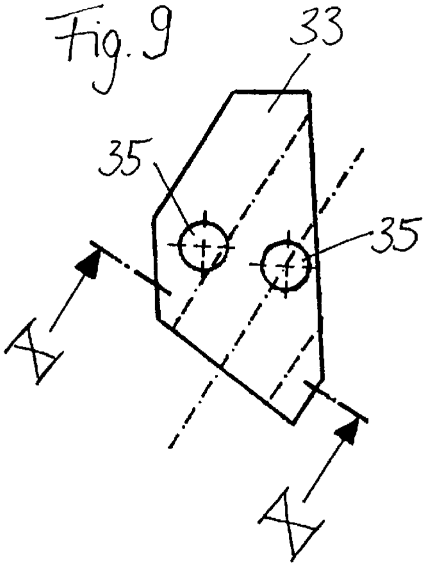
FIG. 9 is a plan view of a holder for connecting the rearward handle tube end to the handle housing.
Figure 10:
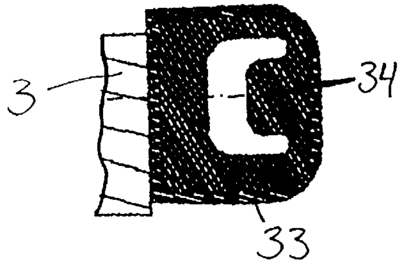
FIG. 10 is a section view taken along line X—X of FIG. 9.

Another embodiment is shown in FIGS. 9 and 10. FIG. 9 shows a holder 33 which is configured as a rectangular hollow profile. The holder 33 is fixed with a screw via a bore 35 on the handle housing 3. As shown in FIG. 10, an antivibration element 34 is mounted within the holder 33. The antivibration element 34 has a U-shaped cutout in its longitudinal direction and this cutout corresponds to the cross section of the rearward end 27 of the handle tube 4. The holder 33 completely surrounds the antivibration element 34 in the peripheral direction. As indicated by broken lines in FIG. 9, the rearward end 27 of the handle tube 4 is mounted in the antivibration element 34 in its longitudinal direction and is fastened via a bore 35 by means of a screw in the tube-shaped holder 33.

Figure 11:
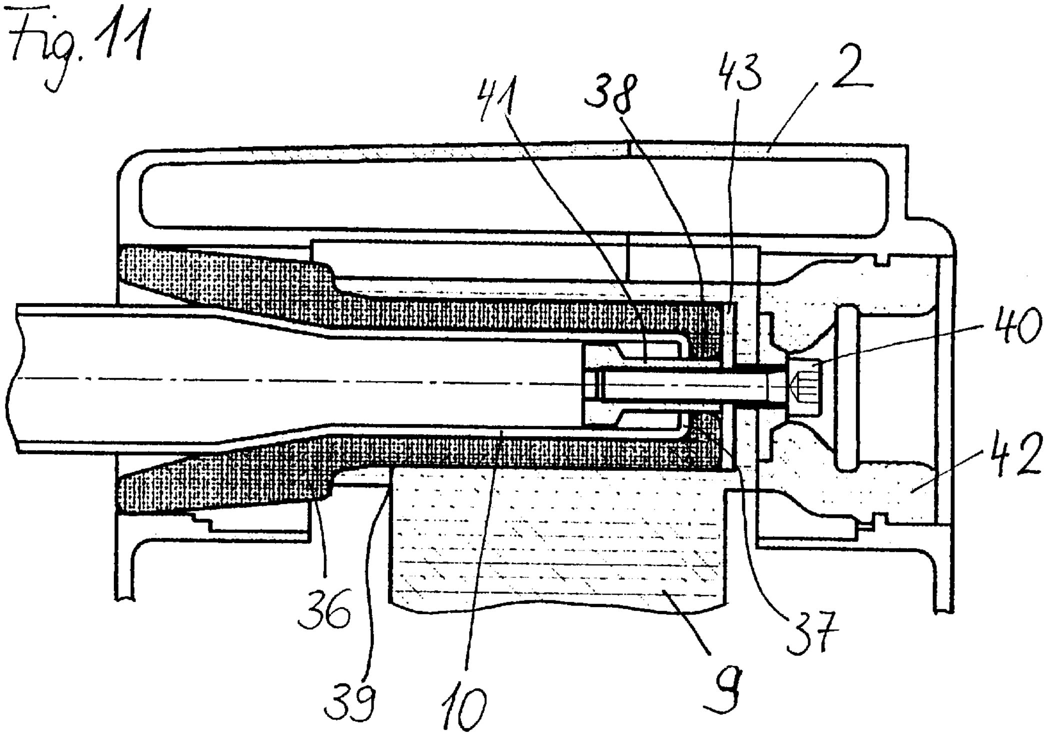
FIG. 11 is a section view of a connection of the forward handle tube end to the handle housing and to the motor housing.

A further embodiment is shown in FIG. 11 wherein the forward handle tube end 10 is connected to the extension 9 of the handle housing 3 as well as to the motor housing 2 via an antivibration element 36. The forward end 10 of the handle tube 4 has a lesser diameter than the handle tube 4 and has, at its end, a collar 37 projecting toward the handle tube center. The handle tube end 10 is mounted within the substantially pot-shaped antivibration element 36. The antivibration element 36 is thickened toward its open edge and is configured so as to be expanded and has an opening 38 in the center of the base lying opposite the open edge. The diameter of the opening 38 corresponds approximately to the diameter of the opening left free by the collar 37 on the forward end 10 of the handle tube 4. The antivibration element 36 is mounted in an approximately cylindrical holder 39 in the extension 9. The holder 39 extends in the axial direction of the handle tube end 10. The handle tube end 10 is fixed to the extension 9 via a screw 40. The screw 40 projects into the interior of the handle tube end 10 through the opening 38 and the opening left clear in the collar 37 and is threadably fastened in the handle tube end 10 in a sleeve 41 having an internal thread. The sleeve 41 has an end facing away from the screw head. At this end, the sleeve 41 has a shoulder which has axial and radial play to the inner wall of the end 10 of the handle tube and functions to prevent a tear-off. The motor housing 2 surrounds the expanded end of the antivibration element 36 and is connected via a substantially cylindrical antivibration element 42 to the end of the extension 9. This end surrounds the base of the antivibration element 36.

The extension 9 has an end which encloses the base of the antivibration element 36. At this end, a disc 43 is mounted between the antivibration element 36 and the extension 9 and this disc defines a support surface for the sleeve 41. The sleeve 41 avoids a pressing together of the antivibration element 36 which is too great when the screws 40 are tightened.

The embodiments shown for attaching the forward end 10 of the handle tube 4 via an antivibration element to the handle housing 3 can also be provided for the attachment of the rearward end 37 of the handle tube 4 and vice versa.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus including a motor-driven chain saw, the portable handheld work apparatus defining a longitudinal axis and comprising:

a drive unit;

a handle housing defining a rearward handle;

antivibration means for connecting said handle housing to said drive unit;

a guide bar connected to said drive unit;

said handle housing having a first end facing away from said guide bar in the longitudinal direction of said guide bar and said handle housing having a second end facing toward said guide bar;

said handle housing having an extension member extending forwardly from said rearward handle at said first end to said second end;

said extension member having a free end portion;

a forward handle tube passing over said drive unit transversely to said longitudinal axis;

said forward handle tube having a first end attached to said free end portion and a second end attached in the region of said rearward handle; and, an antivibration element mounted between at least one of said ends of said forward handle tube and said handle housing so as to cause said forward handle tube itself to be decoupled from said handle housing as to vibration.

2. The work apparatus of claim 1, wherein said antivibration element is a first antivibration element; said work apparatus comprises a second antivibration element; and, said first and second antivibration elements are provided for attaching said first and second ends, respectively.

3. The work apparatus of claim 1, wherein one of said first and second ends is attached via said antivibration element to said handle housing and to a housing part connected to said drive unit.

4. The work apparatus of claim 1, wherein said forward handle tube has a cross-sectional area at said antivibration element which is less than the cross-sectional area at the center region of said forward handle tube.

5. The work apparatus of claim 1, wherein said antivibration element has an approximate cylindrical form and is mounted in the longitudinal direction of said forward handle tube; and, said work apparatus further comprises a holder on said handle housing and said holder is configured to at least partially enclose said antivibration element.

6. The work apparatus of claim 1, wherein said one end of said forward handle tube is mounted within said antivibration element.

7. The work apparatus of claim 1, wherein said extension member has a cutout formed therein; said antivibration element is configured as a bushing having a collar; and, said bushing is mounted in said cutout approximately perpendicular to the longitudinal axis of said forward handle tube.

8. The work apparatus of claim 1, wherein said antivibration element is made of microcellular polyurethane.

9. The work apparatus of claim 1, wherein said antivibration element is configured as a flat structure.

10. The work apparatus of claim 9, wherein said antivibration element comprises first and second parts which partially cover at least one of said ends of said handle housing facing toward said parts and the ends of said handle tube facing toward said parts.

11. The work apparatus of claim 9, wherein said handle tube and said handle housing are attached separate from each other at said antivibration element.

12. The work apparatus of claim 1, wherein said handle housing is attached at a first region of said antivibration element and a housing part connected to said drive unit is attached at a second region of said antivibration element.

13. The work apparatus of claim 12, wherein said extension member of said handle housing is attached at said first region of said antivibration element.

14. The work apparatus of claim 12, wherein said first and second regions are spaced from each other in the longitudinal direction of said handle tube.

15. A portable handheld work apparatus including a motor-driven chain saw, the portable handheld work apparatus defining a longitudinal axis and comprising:

a drive unit;

a handle housing defining a rearward handle;

antivibration means for connecting said handle housing to said drive unit;

a guide bar connected to said drive unit;

said handle housing having a first end facing away from said guide bar with said first end being in the longitudinal direction of said guide bar and said handle housing having a second end facing toward said guide bar;

said handle housing having an extension member extending forwardly from said rearward handle at said first end to said second end;

said extension member having a free end portion;

a forward handle tube passing over said drive unit transversely to said longitudinal axis;

said forward handle tube having a first end attached to said free end portion and a second end attached in the region of said rearward handle;

one of said first and second ends of said forward handle tube being fixed via an antivibration element; and, said one end of said forward handle tube being mounted within said antivibration element.

16. A portable handheld work apparatus including a motor-driven chain saw, the portable handheld work apparatus defining a longitudinal axis and comprising:

a drive unit;

a handle housing defining a rearward handle;

antivibration means for connecting said handle housing to said drive unit;

a guide bar connected to said drive unit;

said handle housing having a first end facing away from said guide bar with said first end being in the longitudinal direction of said guide bar and said handle housing having a second end facing toward said guide bar;

said handle housing having an extension member extending forwardly from said rearward handle at said first end to said second end;

said extension member having a free end portion;

a forward handle tube passing over said drive unit transversely to said longitudinal axis;

said forward handle tube having a first end attached to said free end portion and a second end attached in the region of said rearward handle;

one of said first and second ends of said forward handle tube being fixed via an antivibration element;

said antivibration element being configured as a flat structure; and, said antivibration element including first and second parts which partially cover at least one of said ends of said handle housing facing toward said parts and the ends of said handle tube facing toward said parts.

* * * * *